United States Patent [19]

Jaffe et al.

[11] 3,979,377

[45] Sept. 7, 1976

[54] YELLOW AZO PIGMENT AND PROCESS OF PREPARATION FROM DICHLOROANILINE AND BARBITURIC ACID

[75] Inventors: Edward Ephraim Jaffe, Union, N.J.; William Joseph Marshall, Wilmington, Del.; Ernest Anton Stefancsik, Flemington;, N.J.

[73] Assignee: E. I. Du Pont de Nemours and Company, Wilmington, Del.

[22] Filed: Aug. 8, 1974

[21] Appl. No.: 495,804

[52] U.S. Cl. .............................................. 260/154
[51] Int. Cl.$^2$ ................... C09B 62/24; C09B 29/36
[58] Field of Search ................................... 260/154

[56] References Cited

UNITED STATES PATENTS

| | | | |
|---|---|---|---|
| 2,140,538 | 12/1938 | McNally et al. | 260/154 |
| 3,654,258 | 4/1972 | McKay | 260/154 |

*Primary Examiner*—Allen B. Curtis

[57] ABSTRACT

Yellow azo pigment is prepared by coupling 2,4- or 2,5-dichloroaniline with barbituric acid. In coating compositions these pigments provide high color strength, hiding power, lightfastness and bleed resistance and are particularly useful in industrial finishes.

4 Claims, No Drawings

YELLOW AZO PIGMENT AND PROCESS OF PREPARATION FROM DICHLOROANILINE AND BARBITURIC ACID

BACKGROUND OF THE INVENTION

A wide variety of inorganic and organic pigments are used in the art to impart bright yellow shades to coating compositions designed for interior or exterior surfaces. The most widely used inorganic yellow pigment is chrome yellow, a primrose yellow shade of lead chromate, referred to in the "Color Index" under the designation Lead Sulfochromate CI-77603. Primrose chrome yellow is generally characterized by good color strength and bleed resistance, but suffers from poor lightfastness relative to commonly used organic yellow pigments.

Among the organic yellow pigments, yellow azo pigments prepared by coupling diazotized amines with a variety of coupling compounds are most commonly used. Two well-recognized types of azo yellow pigments have become established in the trade. The first type, known as "toluidine yellows" since a well-known member of the series is obtained by coupling a nitrotoluidine (3-nitro-4-amino toluene) with acetoacetanilide, is generally characterized by moderate color strength and good light-fastness, but poor bleed resistance. One of the toluidine yellows, prepared from coupling diazotized 2-nitro-4-chloroaniline with acetoacet-o-chloroanilide, exhibits superior color strength and lightfastness, but comparably poor bleed resistance. The second type of product, known as "benzidine yellows" is prepared by coupling of tetrazotized derivatives of benzidine (4,4'-diaminobiphenyl) coupled with derivatives of acetoacetanilide. Benzidine yellows exhibit color strength in the order of at least two times that commonly found in the toluidine yellows but have suffered from the defect of poor lightfastness.

The art has long recognized the need for a yellow pigment which exhibits the color strength and lightfastness of the azo yellows in combination with the bleed resistance of the chrome yellows. One attempt to fill this need is disclosed in Johnson U.S. Pat. No. 3,032,546. This patent describes a yellow azo pigment, prepared by coupling diazotized 5-nitro-2-aminoanisole with acetoacet-o-anisidide, having high color strength good lightfastness, and improved bleed resistance. However, Johnson teaches that although this pigment exhibits less bleeding in conventional enamels and water-based paints than prior art toluidine yellows, it is still not free from bleeding and, consequently, must be used with caution whenever paints of different colors are being used at the same time.

This invention provides for new azo pigments having color strength and lightfastness comparable to commonly used organic yellow pigments coupled with the bleed resistance possessed by the chrome yellow pigments.

SUMMARY OF THE INVENTION

The present invention is directed to a yellow azo pigment of the following structural formula

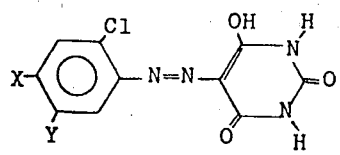

where X is selected from the group consisting of hydrogen and chlorine, Y is selected from the group consisting of hydrogen and chlorine, and only one of X and Y can be hydrogen. The structural formula used to describe the pigments of the present invention is in accordance with the azo structural form conventionally used to describe the product resulting from the reaction of diazotized amines with appropriate coupling compounds. However, since it has been hypothesized in the literature that azo compounds may exist, wholly or partly, in the corresponding hydrazone form, the structural formula describing the azo pigments of the invention includes such tautomeric forms where they exist.

In conventional paint formulations and coating compositions the pigments of the invention provide hiding power, strength and intensity which approximate those of toluidine yellows and chrome yellows. Masstone light-fastness is superior to that exhibited by primrose chrome yellows and comparable to that exhibited by toluidine yellows. In addition, the pigments of the invention possess far better bleed resistance than that possessed by toluidine yellows and, in fact, possess bleed resistance approaching that of chrome yellows.

The pigments of the invention are prepared by coupling a diazotized dichloroaniline selected from the group consisting of 2,4-dichloroaniline and 2,5-dichloroaniline, to barbituric acid in an aqueous medium at temperatures of from about 0°C to 50°C. at a pH of from about 1 to 6.9. The resulting insoluble product is separated from the slurry, washed with water, dried and pulverized. The pigment can be stored in the form of a dry powder or aqueous press cake prior to use in coating compositions.

DETAILED DESCRIPTION OF THE INVENTION

The pH of the aqueous medium in which the coupling reaction is conducted can be maintained between about 1 and 6.9 by adjustment with a mild base, such as sodium carbonate or by conducting the coupling reaction in an aqueous solution buffered with sodium acetate. Although acceptable pigment can be obtained throughout the pH range of 1 to 6.9, in the case of unbuffered coupling it is preferred to adjust the coupling pH to between about 1 and 4 to insure obtainment of a product with optimum tinctorial properties. In the case of the buffered coupling procedure, it is preferred that the coupling pH be between about 4.5 and 6.5 for obtainment of a product with optimum tinctorial properties.

The temperature range over which the coupling reaction of the invention can be conducted successfully is from about 0°C. and 50°C. To obtain pigment with maximum scattering, i.e., high degree of hiding power in paint applications, the preferred coupling temperature range is from about 5°C. to 20°C.

DESCRIPTION OF THE TESTS

Masstone

To determine the masstone of each pigment tested 0.6 g. of the pigment tested is mixed with 1.2 g. of a typical lithographic varnish (an air-drying resin) according to the procedure described in the Journal of the Oil and Colour Chemists Association, No. 396, Vol. XXXVI, June 1953, page 283. The masstone formulations for each pigment tested is spread on white paper and visual comparisons are made.

Strength

The strength of each pigment tested is determined by mixing 0.09 g. of the masstone formulation with 10.0 g. of a zinc oxide paste prepared by mixing 98 parts of the lithographic varnish used to prepare the masstone formulation, one part of a typical varnish drier, and 150 parts of zinc oxide. The relative tinting strength of the pigments tested is determined visually after spreading each of the tinting formulations on white paper.

Hiding Power

Visual hiding occurs when a paint film is sufficiently thick to prevent one from seeing the substrate beneath the film. To determine the relative visual hiding power of the pigments tested, a typical paint composition containing the same pigment to binder ratio for each pigment is sprayed on conventional black and white Morest chart paper. The paper is coated with a thin paint film (less than hiding) at the top and gradually coated with thicker paint films to a point greater than hiding at the bottom of the paper. The point a which hiding occurs for each paint composition is visually determined.

Bleed Resistance

To determine the bleed resistance of each of the pigments tested, a typical industrial enamel, consisting of a nondrying oil-modified alkyd resin and nitrogen resin is ball-milled with equal amounts of pigments so that the resulting pigmented enamel contains the same weight ratio of pigment to binder for each pigment tested. The pigmented enamel is sprayed on a primed metallic surface to the point of visual hiding after which it is dried by flashing one hour and baking at 250°F. (121°C.) for 30 minutes. A portion of the painted surface is then masked. The remainder of the painted surface is sprayed with a topcoat of white enamel to the point of visual hiding, after which it is dried by flashing for one hour and baking at 250°F. (121°C.) for 30 minutes. The panels are visually inspected to determine the relative degree to which the pigment tested comes through the white enamel topcoat.

The invention will be further described in the following examples. Unless otherwise specified, all parts and percentages discussed hereinunder and elsewhere throughout the specification are by weight.

EXAMPLE 1

Ninety-nine grams of 2,4-dichloroaniline is slurried in a solution of 1260 g. of water and 300 ml. of hydrochloric acid (36.5%). The slurry is then heated to 80°C. to dissolve the amine. The amine hydrochloride solution is cooled to 0°C. to 5°C. with ice and, while maintaining the temperature at approximately 0°C., a solution of 42 g. of sodium nitrite in 100 g. of water is added over a period of 15 minutes, followed by a stirring period of 15 minutes, whereupon a clear solution of diazotized amine is formed.

In a separate container 16.8 g. of barbituric acid is dissolved in a solution of 39 g. of sodium carbonate in about 4200 g. of water, by stirring at a temperature of 26°C. to 28°C. The volume is then adjusted to the equivalent of 6000 ml. of water and the temperature adjusted to 5°C. to 10°C. with ice, whereupon the above-prepared diazotized amine is added beneath the surface of the barbituric acid solution in 85 to 90 minutes. At the end of this addition the pH of the resulting pigment slurry is approximately 1.0. To complete the coupling the pH of the slurry is adjusted to between about 3.0 and 4.0 by adding 111 g. of sodium carbonate dissolved in 300 g. of water. The resulting slurry of pigment is filtered and washed substantially free of soluble salts. After drying at about 60°C. and pulverizing, 181 g. of a brilliant yellow pigment is obtained. The average surface area of the pigment is determined from the amount of nitrogen gas adsorbed on the surface of the pigment according to the procedure described in the Analyst, 88, No. 1044, 156–187 (March 1963) and found to be about 13 m²/g. After recrystallization from dimethyl formamide, the pigment is analyzed and found to contain 39.9% C, 1.99% H and 19.1% N (Calculated values for $C_{10}H_6Cl_2N_4O_3$: 39.3% C, 1.99% H and 18.6% N).

This yellow azo pigment exhibits tinctorial properties, i.e., intensity, strength, hiding power and light-fastness, which approximate those of a conventional toluidine yellow made by coupling diazotized 2-nitro-4-chloroaniline with acetoacet-o-chloroanilide. The bleed resistance of this pigment is far superior to that of the toluidine yellow and approaches that of primrose chrome yellow.

EXAMPLE 2

The procedure of Example 1 is followed except that prior to isolation of the product the resultant slurry of pigment is heated with open steam to boiling and held at the boiling point for 15 minutes. The pigment is isolated as in Example 1 and found to have an average surface area of about 2 m²/g. determined as in Example 1. The pigment is found to be less opaque in masstone and weaker in tint than the pigment of Example 1, but has comparable bleed resistance and lightfastness to the pigment of Example 1.

EXAMPLE 3

Forty-eight grams of 2,4-dichloroaniline is slurried in a solution of 48.9 g. of hydrochloric acid (100%) and 560 g. of water, and the slurry is diluted to a volume equal to 790 ml. of water and is stirred at about 82°C. until all of the amine is dissolved. The solution is cooled to approximately 0°C. with ice, and while maintaining the temperature at approximately 0°C., a solution of 21.1 g. of sodium nitrite in 50 g. of water is added over a period of 10 to 12 minutes, followed by a stirring period of one hour whereupon a solution of the diazotized amine is formed.

In a separate container 39.6 g. of barbituric acid is dissolved in a solution of 87.9 g. of sodium hydroxide in about 2200 g. of water. When the solution is clear, a solution of 114 ml. of acetic acid (100%) diluted with an equal volume of water is added to the solution. The pH of the resulting solution is normally about 6.3. If the pH significantly differs from this value, it should be adjusted by suitable additions of acid or alkali. The volume of the solution is then adjusted to the equivalent of 2750 ml. of water, and the temperature adjusted to 5°C. to 10°C., whereupon the above-prepared diazotized amine is added beneath the surface of the barbituric acid solution in about 60 minutes. The pH of the final slurry of pigment is adjusted to a pH of about 4.5. The slurry is filtered without heating, washed substantialy free of soluble salts. After dryng at about 60°C., and pulverizing 85 g. of a brilliant yellow pigment is obtained.

The tinctorial properties, lightfastness, and bleed resistance of this pigment are substantially the same as those exhibited by the pigment of Example 1.

EXAMPLE 4

Forty-eight grams of 2,5-dichloroaniline is slurried in a solution of 74.7 g. of hydrochloric acid (100%) and 420 g. of water, and is stirred at 90°C. to 95°C. until the amine is dissolved, thereupon the volume is adjusted to the equivalent of 1200 ml. of water and the temperature is adjusted to about 75°C.

In a separate container 21.1 g. of sodium nitrite is dissolved in 375 g. of water and cooled to about 0°C. with ice, and the separately prepared amine solution is added to the sodium nitrite solution in about 15 minutes, while maintaining the temperature below 10°C., to form the diazotized amine. The excess nitrous acid is removed by addition of about 2 g. of sulfamic acid to the diazo solution.

In a seperate container 39.6 g. of barbituric acid is dissolved in a solution of 87.9 g. of sodium hydroxide in about 2500 g. of water. When the solution is clear, a solution of 114 ml. of acetic acid (100%) diluted with an equal volume of water is added to the solution. The pH of the resulting solution should be about 6.3 and should be adjusted to this value if it is significantly different. The volume is adjusted to the equivalent of 3300 ml. of water, and the temperature adjusted to 5°C. to 10°C., whereupon the separately prepared diazo is added beneath the surface of the barbituric acid solution in about 90 minutes. The pH of the final slurry is adjusted to about 3.7. The slurry is filtered without heating and washed substantially free of soluble salts. After drying at about 60°C. and pulverizing 87.8 g. of a light intense yellow pigment is obtained.

This pigment is more intense and exhibits greater hiding power than the pigment of Example 1, but is somewhat less lightfast. The bleed resistance of this pigment is comparable to that of the pigment of Example 1.

Control

This control demonstrates the critical nature of the positions the chlorine radicals occupy on the dichloroaniline ring.

The procedure of Example 4 is followed except that 48.6 g. of 3,4-dichloroaniline is used in place of 2,5-dichloroaniline. After drying and pulverizing as in Example 4, 87.3 g. of a red shade yellow pigment are obtained.

This pigment is somewhat stronger than the 2,5-dichloro-substituted pigment of Example 4 and somewhat weaker than the 2,4-dichloro-substituted pigment of Example 1, but is much less lightfast than either the 2,5-dichloro or the 2,4-dichloro pigments. Though the bleed resistance of this pigment is superior to that of toluidine yellows, the inferior lightfastness of this pigment renders it unsuitable for many applications.

What is claimed is:

1. A yellow azo pigment of the formula

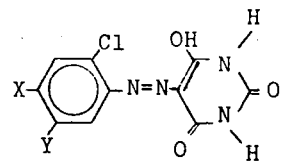

where X is selected from the group consisting of hydrogen and chlorine, Y is selected from the group consisting of hydrogen and chlorine and only one of X and Y can be hydrogen.

2. Process for preparing a yellow azo pigment of the formula

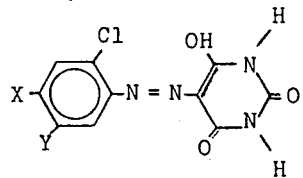

where X and Y are selected from the group consisting of hydrogen and chlorine and only one of X and Y can be hydrogen, by coupling a diazotized dichloroaniline, selected from the group consisting of 2,4-dichloroaniline and 2,5-dichloroaniline, to barbituric acid in an aqueous medium at a temperature of from about 0°C. to 50°C. at a pH of from 4.5 to 6.5 in the presence of a buffer and separating said yellow azo pigment thereby formed.

3. Process according to claim 2 wherein the temperature of the aqueous medium is from about 5°C. to 20°C.

4. Process according to claim 3 wherein the buffer is sodium acetate.

* * * * *

Dedication 3,979,377.—*Edward Ephraim Jaffe*, Union, N.J., *William Joseph Marshall*, Wilmington, Del., and *Ernest Anton Stefancsik*, Flemington, N.J. YELLOW AZO PIGMENT AND PROCESS OF PREPARATION FROM DICHLOROANILINE AND BARBITURIC ACID. Patent dated Sept. 7, 1976. Dedication filed Aug. 16, 1978, by the assignee, *E. I. Du Pont De Nemours and Company*.

Hereby dedicates said patent to the Public.

[*Official Gazette October 17, 1978.*]